(12) United States Patent
Leber

(10) Patent No.: US 6,974,008 B2
(45) Date of Patent: Dec. 13, 2005

(54) HYDRODYNAMIC CONVERTER WITH PRIMARY AND CONVERTER BRIDGING CLUTCHES

(75) Inventor: Fritz Leber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 48 days.

(21) Appl. No.: 10/773,656

(22) Filed: Feb. 6, 2004

(65) Prior Publication Data

US 2004/0188208 A1    Sep. 30, 2004

(30) Foreign Application Priority Data

Mar. 28, 2003    (DE) ................. 103 14 338

(51) Int. Cl.[7] ............................................. F16D 45/02
(52) U.S. Cl. ................................. 192/3.25; 192/3.3
(58) Field of Search ....................... 192/3.25, 3.26, 192/3.27, 3.29, 3.3

(56) References Cited

U.S. PATENT DOCUMENTS

| | | | |
|---|---|---|---|
| 3,820,417 A | 6/1974 | Allen et al. | |
| 5,400,884 A | * 3/1995 | Matsuoka | ............. 192/3.25 |
| 5,509,520 A | 4/1996 | Evans et al. | |
| 5,699,887 A | 12/1997 | Kundermann | |
| 6,494,303 B1 | 12/2002 | Reik et al. | |

FOREIGN PATENT DOCUMENTS

| | | | | |
|---|---|---|---|---|
| DE | 195 21 458 A1 | 12/1995 | ........... | F16H 59/40 |
| DE | 195 08 613 A1 | 9/1996 | ........... | F16H 61/62 |
| DE | 100 24 191 A1 | 11/2000 | ........... | F16H 41/04 |
| JP | 2001227617 A | * 8/2001 | ........... | F16H 45/00 |

* cited by examiner

Primary Examiner—Richard M. Lorence
(74) Attorney, Agent, or Firm—Davis & Bujold, P.L.L.C.

(57) ABSTRACT

A hydrodynamic converter (1) for the drive train of a motor vehicle is proposed, which comprises a pump (2), a turbine (3) which is connected to a transmission input shaft (4), a stator (5), a primary clutch (PK) which connects a drive (6) detachably to the pump (pump impeller) (2) and a converter bridging clutch (WK), which connects the drive (6) detachably to the transmission input shaft (4), in which the primary clutch (PK) and the converter bridging clutch (WK) can be actuated by a common piston (8) via a common oil supply (9).

21 Claims, 5 Drawing Sheets

HYDRODYNAMIC CONVERTER WITH PRIMARY AND CONVERTER BRIDGING CLUTCHES

This application claims priority from German Application Serial No. 103 14 338.6 filed Mar. 28, 2003.

FIELD OF THE INVENTION

The present invention concerns a hydrodynamic converter with primary and converter bridging clutches for the drive train of a motor vehicle, in particular a working machine such as a wheel loader, a stacker or a dumper. Further, the invention concerns a method for controlling and/or regulating the primary and converter bridging clutches of the hydrodynamic converter according to the invention.

BACKGROUND OF THE INVENTION

Since the introduction of automatic transmissions, hydrodynamic converters have formed the link between a drive engine and the actual transmission. A converter, on the one hand, enables comfortable, jerk-free starting by virtue of slippage and at the same time damps speed irregularities of the combustion engine. On the other hand, the torque magnification inherent in its principle provides a large starting torque.

According to the present state of the art, a hydrodynamic converter consists of a pump impeller, a turbine rotor, the reaction element (reactor, stator) and the oil required for torque transmission.

The pump impeller, which is driven by the engine, moves the oil in a cyclic flow. This oil flow impinges on the turbine rotor and is there deflected in the flow direction.

In the hub area, the oil leaves the turbine and passes to the reaction element (stator), where it is again deflected and so led back to the pump impeller in the appropriate flow direction.

Owing to the deflection, a torque is produced on the stator, whose reaction moment increases the turbine torque. The ratio of turbine torque to pump torque is denoted as the torque boost. The larger the rotation speed difference between the pump and turbine, the larger is the torque boost which is maximum when the turbine is at rest. As the turbine speed increases, the torque boost decreases. If the turbine speed reaches around 85% of the pump speed, the torque boost=1, i.e., the turbine and pump torques are equal.

In this condition, the stator, which is supported on the transmission housing via the freewheel and the reactor shaft, runs freely in the flow and the freewheel is overrolled. From this point onwards, the converter operates as a pure flow coupling. During conversion the stator is stationary and is supported on the housing via the freewheel.

From the prior art converters are known, which comprise a converter bridging clutch and a primary clutch, the primary clutch (PK) being arranged between the engine and the converter and the converter bridging clutch between the engine and the transmission.

Such converters are usually provided for vehicles which work at very low speeds, but which can also drive at high speeds. For example, within the scope of DE 195 21 458 A1 a converter with a converter bridging clutch and a primary clutch is described. According to this prior art, the converter bridging clutch and the primary clutch are each provided with their own pressure supply and their own valve unit.

The purpose of the present invention is to provide a hydrodynamic converter comprising a converter bridging clutch and a primary clutch, which is of compact structure with a small number of components. Furthermore, a method for controlling and/or regulating the primary and converter bridging clutches of the hydrodynamic converter according to the invention is proposed.

SUMMARY OF THE INVENTION

According to the invention, it is proposed to arrange the converter bridging clutch and the primary clutch in the converter in such manner that both clutches are acted upon or actuated by a common piston. The converter bridging clutch and the primary clutch are preferably made as disk clutches.

According to the invention, the common piston is arranged in such manner that it is acted upon on one side by the internal pressure of the converter and, on the other side, by the pressure built up in the piston space, so that depending on the ratio of the converter's internal pressure to the pressure in the piston space, the piston is moved in a particular direction and, depending on that direction, one or other of the clutches is actuated.

It is preferable for both clutches to be located on the same side of the converter, preferably on the engine side. In this respect a particularly advantageous arrangement has the clutches positioned one above the other or next to one other.

To control the clutches, a common valve unit is provided, which delivers or controls a pressure between zero bar and the system pressure, so that in the pressure range between zero bar and the converter pressure the transmission ability of the primary clutch is controlled or regulated, while in the pressure range between the converter pressure and the system pressure the transmission ability of the converter bridging clutch is controlled or regulated.

BRIEF DESCRIPTION OF THE DRAWINGS

The invention will now be described, by way of example, with reference to the accompanying drawings in which.

DETAILED DESCRIPTION OF THE INVENTION

Figure 1:
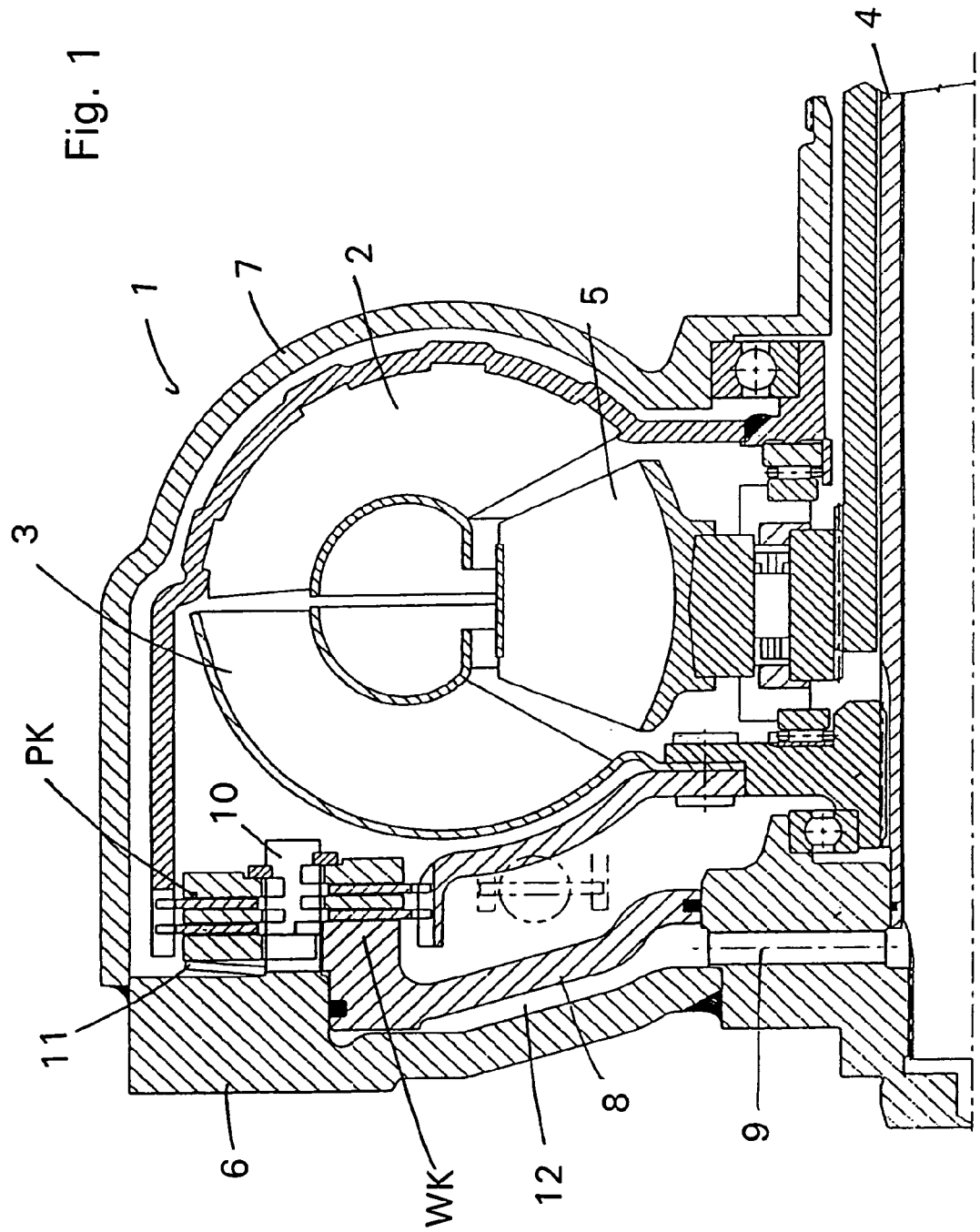
FIG. 1 is a first embodiment of the present invention, in which the converter bridging clutch and the primary clutch are arranged one above the other.

FIG. 1 shows a hydrodynamic converter 1 comprising a pump 2, a turbine 3 connected to the transmission input shaft 4 and a stator 5. A drive 6 of the engine and a converter shell 7 are also shown. The converter comprises a primary clutch PK, which connects the drive 6 detachably to the pump 2, and a converter bridging clutch WK, which connects the drive 6 detachably to the transmission or the transmission input shaft 4.

According to the invention, the primary clutch PK and the converter bridging clutch WK are arranged approximately one above the other and are actuated by a common piston 8 via a common oil supply 9. The same indexes are also used in FIGS. 2 through 5.

In this case, the pump 2 (pump impeller) is connected to or made as one piece with the outer disk carrier of the primary clutch. The inner disk carrier of the primary clutch PK is connected to or made as one piece with a web 10 connected to the drive 6. The turbine 3 is connected to the inner disk carrier of the converter bridging clutch WK; in addition, the drive 6 is connected to the outer disk carrier of the converter bridging clutch via the same web 10.

The converter bridging clutch WK is made as a "positive clutch", i.e., it is closed when acted on by pressure. In contrast, for the example embodiment shown in FIG. 1, the primary clutch is made as a "negative clutch", i.e., the primary clutch is closed by the spring force of a spring 11 and opened when acted on by pressure.

The two clutches operate as follows. When a piston space 12 is acted on by a pressure higher than the converter pressure, the piston 8 presses against the disk pack of the converter bridging clutch and the converter bridging clutch closes.

When the pressure in the piston space 12 falls below the converter pressure, the piston 8 is pushed by the converter pressure in the direction of the piston space 12 so that the disk pack of the primary clutch, which was previously pressed together by the spring 11, is unloaded allowing the primary clutch to open.

Figure 2:
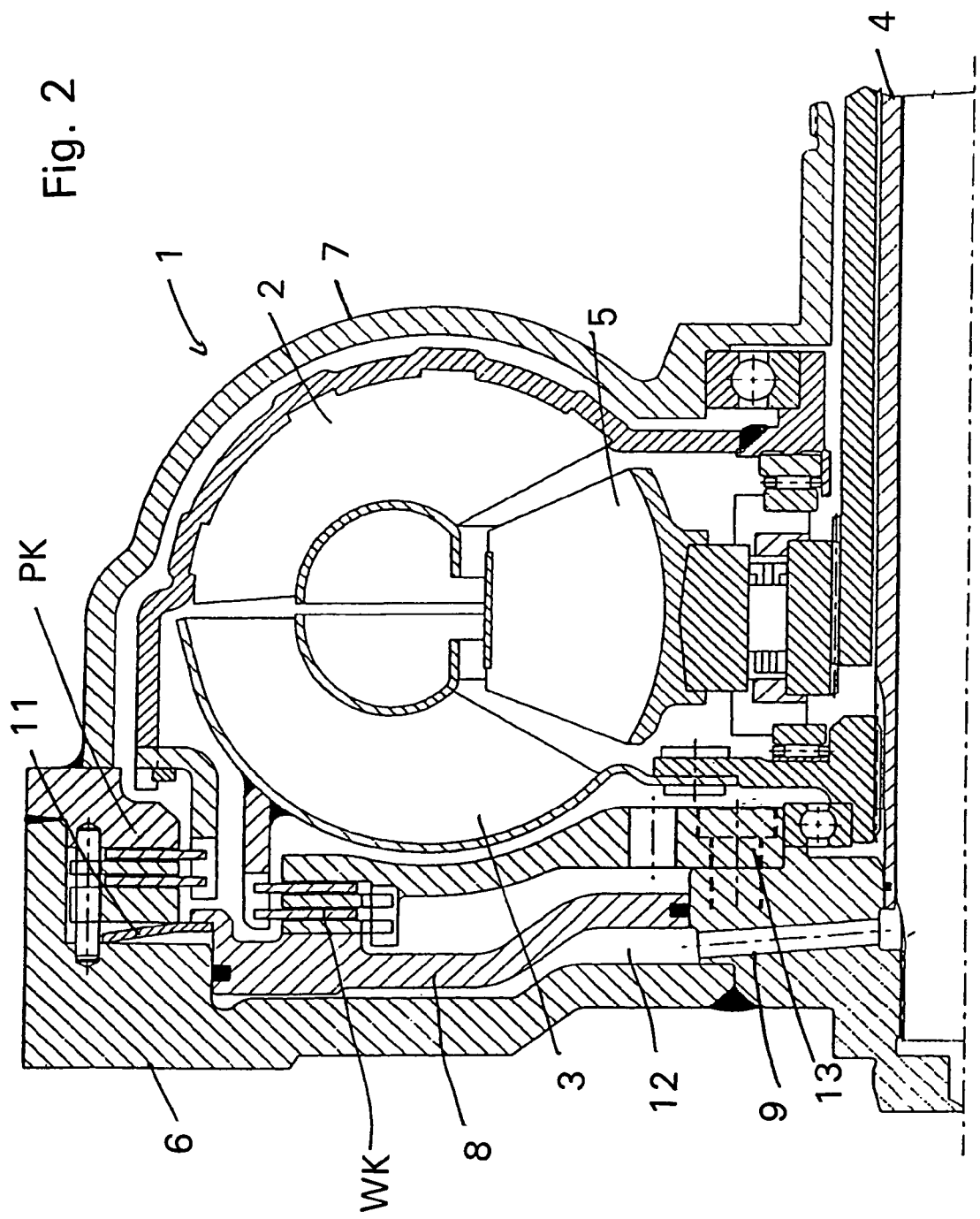
FIG. 2 is a second embodiment of the invention, in which the converter bridging clutch and the primary clutch are arranged one above the other.
Figure 3:
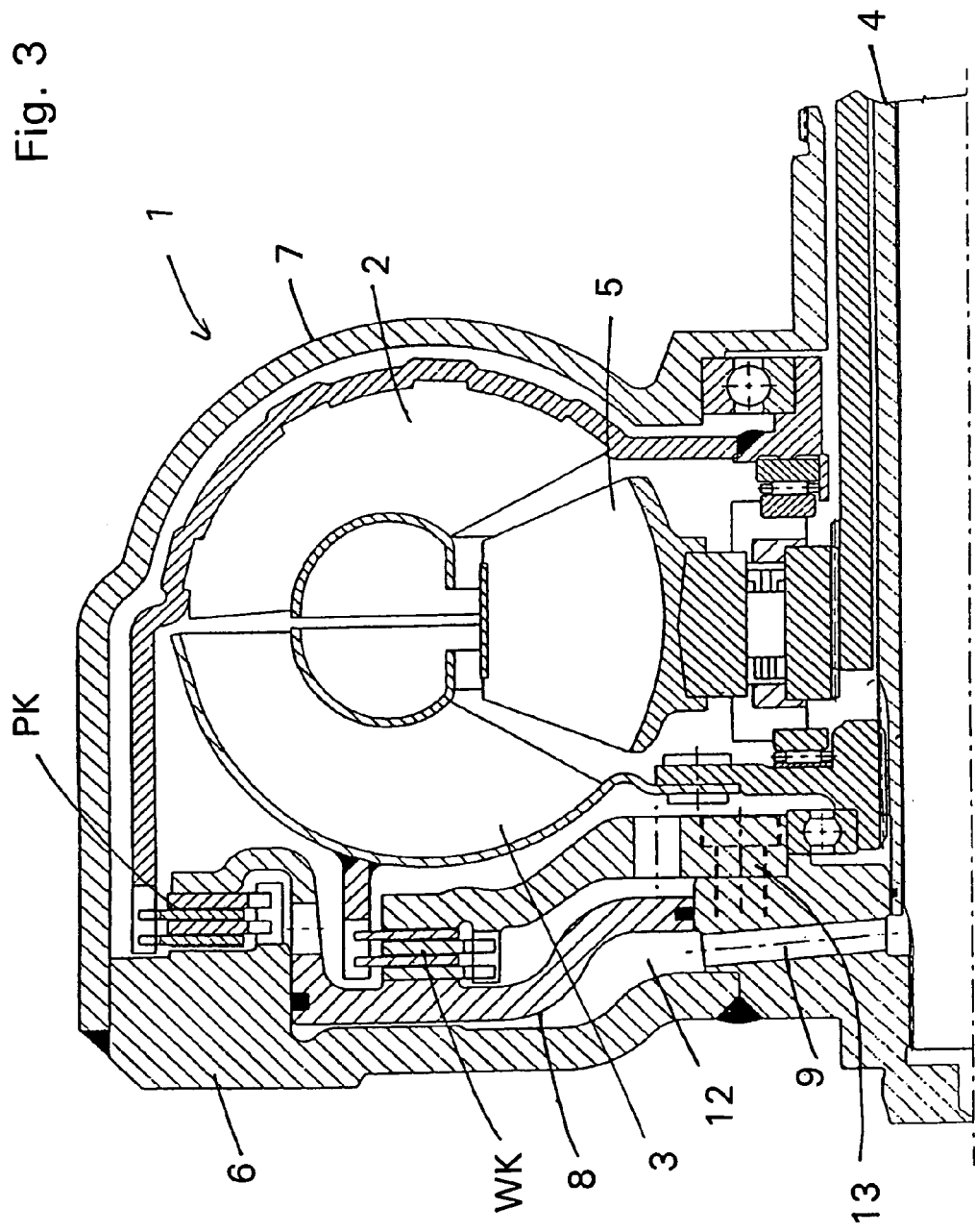
FIG. 3 is a third embodiment of the invention, in which the converter bridging clutch and the primary clutch are arranged one above the other.

FIG. 2 shows another example embodiment of a converter according to the invention. In this case too, the primary clutch PK and the converter bridging clutch WK are arranged approximately one above the other and are actuated by a common piston 8 via a common oil supply 9.

Here, the pump 2 is connected to the inner disk carrier of the primary clutch. The outer disk carrier of the primary clutch PK is connected to the drive 6. The turbine 3 is connected to the outer disk carrier of the converter bridging clutch WK and the drive 6 is connected to the inner disk carrier of the converter bridging clutch via a disk 13 that is bolted on.

The operation of the two clutches corresponds to that described for FIG. 1, since the converter bridging clutch WK is again made as a "positive clutch" and the primary clutch PK as a "negative clutch".

The example embodiment (shown in FIG. 3) differs from that of FIG. 2 in that the primary clutch PK too is made as a "positive clutch". In this case, the pump 2 is connected to the outer disk carrier of the primary clutch. The inner disk carrier of the primary clutch PK is connected to the drive 6. The turbine 3 is connected to the outer disk carrier of the converter bridging clutch WK and the drive 6 is connected to the inner disk carrier of the converter bridging clutch via a bolted-on disk 13.

With the "positive" primary clutch PK, when the pressure in the piston space 12 falls the piston 8 presses against the disk pack, thereby closing the clutch.

Accordingly, on changing from a closed primary clutch to a closed converter bridging clutch, the primary clutch opens first and only then does the converter bridging clutch open.

Figure 4:
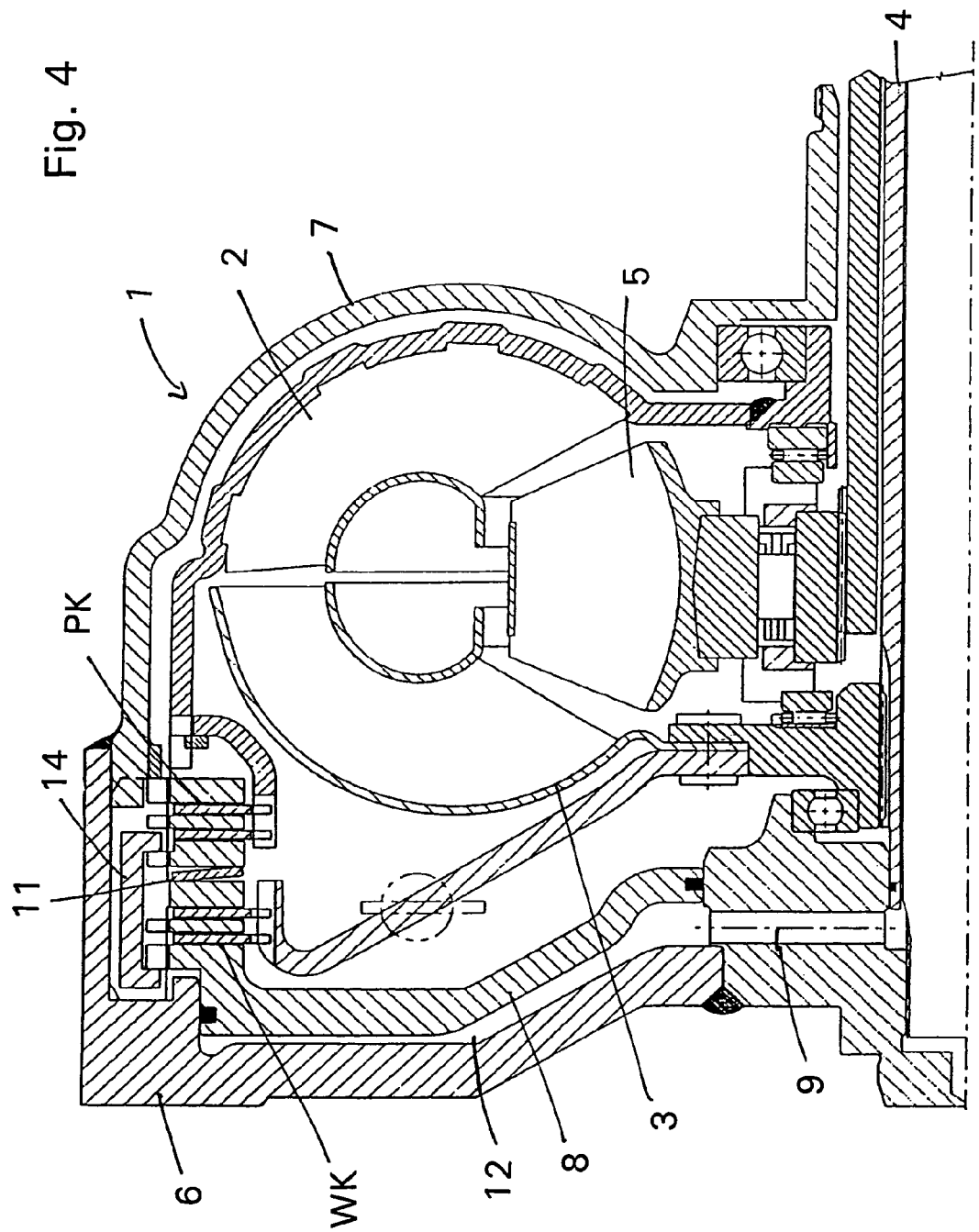
FIG. 4 is a fourth embodiment of the invention, in which the converter bridging clutch and the primary clutch are arranged next to one another.
Figure 5:
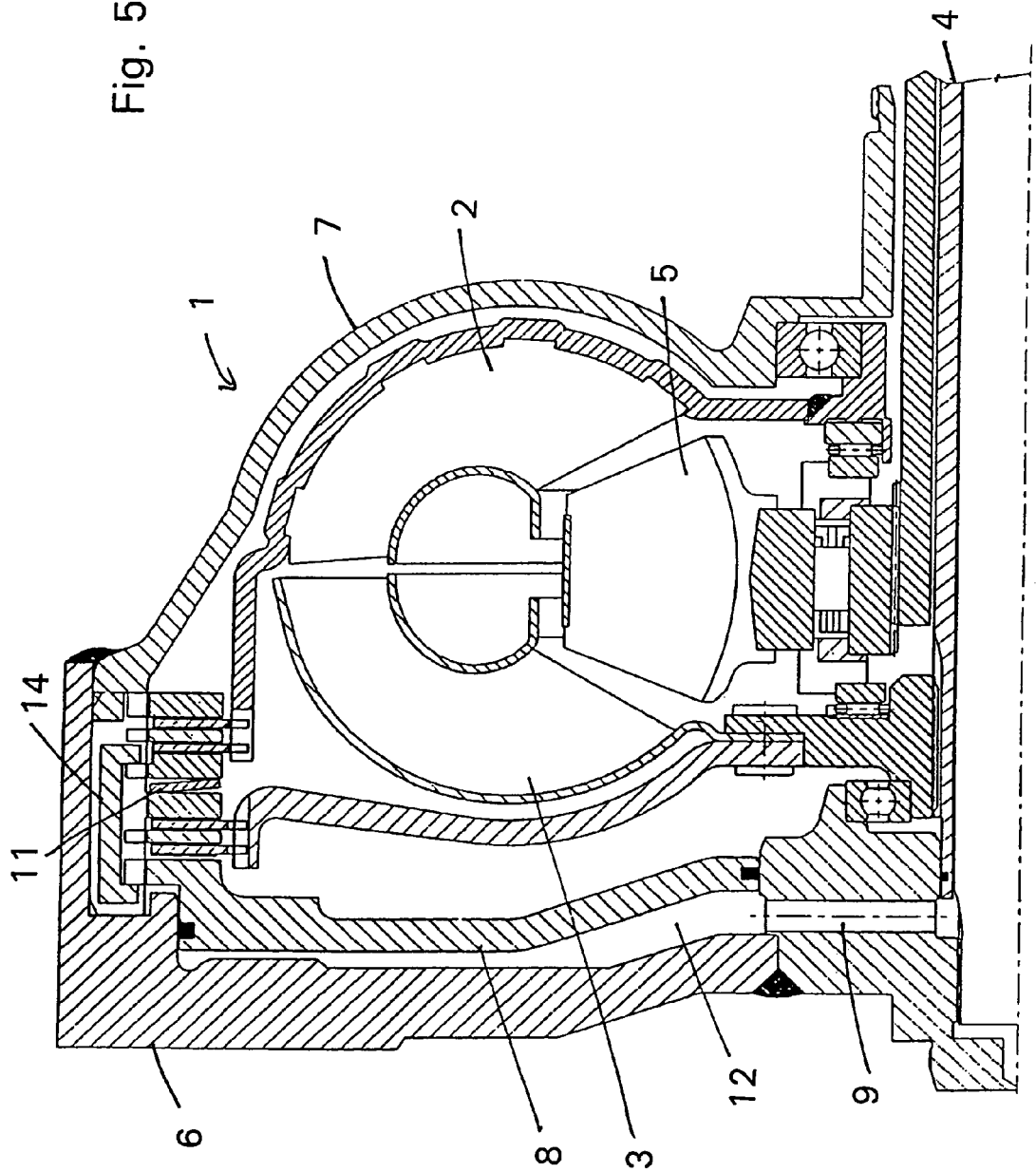
FIG. 5 is a further embodiment of the invention, in which the converter bridging clutch and the primary clutch are arranged next to one another.

According to the invention, the two clutches can also be arranged essentially next to one another, as is the case in the example embodiments shown in FIGS. 4 and 5.

In FIGS. 4 and 5, the pump 2 is connected to the inner disk carrier of the primary clutch PK and the outer disk carrier of the primary clutch PK is connected to the drive 6 via the converter shell. The turbine 3 is connected to the inner disk carrier of the converter bridging clutch WK and the drive 6 is connected to the outer disk carrier of the converter bridging clutch via a web 14. The two embodiments differ in the construction of the inner disk carrier of the converter bridging clutch WK. Furthermore, in the embodiment of FIG. 5, the two clutches PK and WK are positioned further out, giving a smaller structural length for the converter 1.

The operation of the clutches PK and WK corresponds to that described for FIGS. 1 and 2, since the converter bridging clutch WK is made as a "positive clutch" and the primary clutch as a "negative clutch".

For the control of the clutches PK and WK, according to the invention, a common valve unit is needed, which delivers or regulates a pressure between 0 bar and the system pressure.

In the pressure range 0 bar to the converter pressure the transmission ability of the primary clutch is controlled or regulated, while in the pressure range between the converter pressure and the system pressure the transmission ability of the converter bridging clutch is controlled or regulated.

In the embodiments in which the primary clutch PK is made as a "negative" clutch when the converter pressure is exceeded in the piston space 12, the converter bridging clutch is closed, while the primary clutch remains closed.

When the pressure in the piston space is about equal to the converter pressure, the converter bridging clutch is opened and the primary clutch closed. When the pressure falls below the internal pressure of the converter, the piston 8 pushes against the force of the spring 11 and the primary clutch PK opens.

REFERENCE NUMERALS

1 Hydrodynamic converter
2 Pump impeller
3 Turbine
4 Transmission input shaft
5 Stator
6 Drive engine
7 Converter shell
8 Piston
9 Oil supply
10 Web
11 Spring
12 Piston space
13 Disk
PK Primary clutch
WK Converter bridging clutch

What is claimed is:

1. A hydrodynamic converter for the drive train of a motor vehicle comprising:
   a pump (2);
   a turbine (3) connected to a transmission input shaft (4);
   a stator (5);
   a primary clutch (PK) which connects the drive (6) of the converter detachably to the pump (2); and
   a converter bridging clutch (WK) which connects the drive (6) detachably to the transmission input shaft (4), wherein the primary clutch (PK) and the converter bridging clutch (WK) can be activated by a common piston (8) via a common oil supply (9).

2. The hydrodynamic converter according to claim 1, wherein the common piston (8) is arranged so that on one side it is acted upon by the internal pressure of the converter and on the other side by the pressure built up in the piston space (12), so that depending on the ratio between the converter's internal pressure and the pressure in the piston space, the piston (8) can be moved in a particular direction, and depending on the said direction, in each case a clutch (PK, WK) can be actuated.

3. The hydrodynamic converter according to claim 1, wherein the primary clutch (PK) and the converter bridging clutch (WK) are arranged on the same side of the converter.

4. The hydrodynamic converter according to claim 1, wherein the primary clutch (PK) and the converter bridging clutch (WK) are arranged on the engine side.

5. The hydrodynamic converter according to claim 1, wherein the primary clutch (PK) and the converter bridging clutch (WK) are positioned approximately one above the other or one next to the other.

6. The hydrodynamic converter according to claim 1, wherein the converter bridging clutch (WK) can be closed by the action of pressure and the primary clutch (PK) can be closed by the spring force of a spring (11) and can be opened by the action of pressure.

7. The hydrodynamic converter according to claim 1, wherein the converter bridging clutch (WK) is closed by operation of the common piston (8) when a pressure in a piston space (12) exceeds an internal pressure of the converter and the primary clutch (PK) is closed by operation of the common piston (8) when the internal pressure of the converter exceeds the pressure in the piston space (12).

8. The hydrodynamic converter according to claim 1, wherein the pump (2) is connected to the outer disk carrier of the primary clutch (PK), the inner disk carrier of the primary clutch (PK) is connected to a web (10) connected to the drive (6), the turbine (3) is connected to the inner disk carrier of the converter bridging clutch (WK) and the drive (6) is connected to the outer disk carrier of the converter bridging clutch (WK) via the web (10).

9. The hydrodynamic converter according to claim 1, wherein the pump (2) is connected to the inner disk carrier of the primary clutch (PK), the outer disk carrier of the primary clutch (PK) is connected to the drive (6), the turbine (3) is connected to the outer disk carrier of the converter bridging clutch (WK) and the drive (6) is connected to the inner disk carrier of the converter bridging clutch (WK) via a bolted-on disk (13).

10. The hydrodynamic converter according to claim 1, wherein the pump (2) is connected to the inner disk carrier of the primary clutch (PK), the outer disk carrier of the primary clutch (PK) is connected with the drive (6) via a converter shell, the turbine (3) is connected to the inner disk carrier of the converter bridging clutch (WK) and the drive (6) is connected to the outer disk carrier of the converter bridging clutch (WK) via a web (14).

11. The hydrodynamic converter according to claim 7, wherein the pump (2) is connected to the outer disk carrier of the primary clutch (PK), the inner disk carrier of the primary clutch (PK) is connected to the drive (6), the turbine (3) is connected to the outer disk carrier of the converter bridging clutch (WK), and the drive (6) is connected to the inner disk carrier of the converter bridging clutch (WK) via a bolted-on disk (13).

12. The hydrodynamic converter according to claim 1, wherein to control the clutches (PK) and (WK) the common oil supply (9) is provided, which delivers or regulates a pressure between 0 bar and a system pressure, such that in the pressure range 0 bar to a converter pressure the transmission ability of the primary clutch (PK) can be controlled or regulated, while the pressure range between the converter pressure and the system pressure the transmission ability of the converter bridging clutch (WK) can be controlled or regulated.

13. A method for at least one of controlling and regulating a primary clutch and a converter bridging clutch of a hydrodynamic converter, in particular a hydrodynamic converter for a drive train of a motor vehicle the hydrodynamic converter comprising: a pump (2); a turbine (3) that is connected to a transmission input shaft (4); a stator (5); a primary clutch (PK) which connects a drive (6) detachably to the pump (2); and a converter bridging clutch (WK) which connects the drive (6) detachably to the transmission input shaft (4), wherein the primary clutch (PK) and the converter bridging clutch (WK) can be activated by a common piston (8) via a common oil supply (9), the converter bridging clutch (WK) can be closed by action of pressure and the primary clutch (PK) can be closed by spring force of a spring (11) and can be opened by action of pressure, the method comprising the steps of:

one of delivering or regulating by means of the common oil supply, a pressure between zero bar and a system pressure, in a pressure range 0 bar to a converter pressure such that the transmission ability of the primary clutch (PK) can be one of controlled or regulated; and one of controlling or regulating the transmission ability of the converter bridging clutch (WK) in the pressure range between the converter pressure and the system pressure.

14. The method according to claim 13, wherein when the primary clutch (PK) is made as a "negative" clutch and the converter bridging clutch (WK) is made as a "positive" clutch, when the converter's internal pressure is exceeded in a piston space (12) the converter bridging clutch is closed, while the primary clutch remains closed, and when the pressure falls below the converter's internal pressure, the common piston (8) is pressed against the force of the spring (11) and the primary clutch (PK) opens, while the converter bridging clutch (WK) is open, and when the pressure in the piston space (12) is about equal to the converter's internal pressure, the converter bridging clutch (WK) is open and the primary clutch (PK) is closed.

15. The method according to claim 13, wherein
the pump (2) is connected to the outer disk carrier of the primary clutch (PK), the inner disk carrier of the primary clutch (PK) is connected to the drive (6), the turbine (3) is connected to the outer disk carrier of the converter bridging clutch (WK), and the drive (6) is connected to the inner disk carrier of the converter bridging clutch (WK) via a bolted-on disk (13), so that
when pressure in the piston space (12) exceeds the converter's internal pressure the converter bridging clutch (WK) is closed while the primary clutch remains open, and when the pressure in the piston space (12) falls below the converter's internal pressure the primary clutch closes while the converter bridging clutch (WK) is open.

16. A clutch mechanism for a hydrodynamic converter including a pump (2) and a turbine (3) connected to an input shaft (4) of the converter, the clutch mechanism comprising:

a primary clutch (PK) for selectably connecting the pump (2) to a drive (6) of the converter;

a bridging clutch (WK) for selectably connecting the turbine (3) and the input shaft (4) to the drive (6);

a common piston (8) for actuating both the primary clutch (PK) and the bridging clutch (WK);

the common piston (8) being actuated to movement in one of a first direction and a second direction by a ratio between an internal pressure of the converter and a pressure in a piston space, and movement of the common piston (8) in the first direction operating to open the primary clutch (PK) and close the bridging clutch (WK) and movement of the common piston (8) in the second direction operating to close the primary clutch (PK) and open the bridging clutch (WK).

17. The clutch mechanism for a hydrodynamic converter of claim 16, wherein:

the primary clutch (PK) is resiliently biased toward a closed position by a spring (11) and moved to an open position by operation of the common piston (8).

18. The clutch mechanism for a hydrodynamic converter of claim 16, wherein the pump (2) is connected to the outer disk carrier of the primary clutch (PK), the inner disk carrier of the primary clutch (PK) is connected to a web (10), the web (10) is connected to the drive (6), the turbine (3) is connected to the inner disk carrier of the converter bridging clutch (WK), and the drive (6) is connected to the outer disk carrier of the converter bridging clutch (WK) through the web (10).

19. The clutch mechanism for a hydrodynamic converter of claim 16, wherein the pump (2) is connected to the inner disk carrier of the primary clutch (PK), the outer disk carrier of the primary clutch (PK) is connected to the drive (6), the turbine (3) is connected to the outer disk carrier of the converter bridging clutch (WK) and the drive (6) is connected to the inner disk carrier of the converter bridging clutch (WK) through a bolted-on disk (13).

20. The clutch mechanism for a hydrodynamic converter of claim 16, wherein the pump (2) is connected to the inner disk carrier of the primary clutch (PK), the outer disk carrier of the primary clutch (PK) is connected with the drive (6) through a converter shell, the turbine (3) is connected to the inner disk carrier of the converter bridging clutch (WK) and the drive (6) is connected to the outer disk carrier of the converter bridging clutch (WK) through a web (14).

21. The clutch mechanism for a hydrodynamic converter of claim 16, wherein the pump (2) is connected to the outer disk carrier of the primary clutch (PK), the inner disk carrier of the primary clutch (PK) is connected to the drive (6), the turbine (3) is connected to the outer disk carrier of the converter bridging clutch (WK), and the drive (6) is connected to the inner disk carrier of the converter bridging clutch (WK) through a bolted-on disk (13).

* * * * *